Oct. 1, 1968   F. G. EUBANKS   3,403,441

COMPOSITE WIRE STRIPPING BLADES

Filed Aug. 19, 1966

INVENTOR.
Floyd G. Eubanks
BY Robert W. Mc Manigal
Attorney 3,403,441
COMPOSITE WIRE STRIPPING BLADES
Floyd G. Eubanks, Pasadena, Calif., assignor of ten percent to Robert M. McManigal, South Pasadena, Calif.
Filed Aug. 19, 1966, Ser. No. 573,597
3 Claims. (Cl. 30—90.1)

ABSTRACT OF THE DISCLOSURE

A composite blade structure for cutting and stripping insulation from an insulated wire having a wire core held to close tolerances, and an insulation covering which may vary slightly in diameter for different wire runs, or wires of different manufacture, wherein an insulation cutting blade having a wire receiving notch designed to the close wire core tolerance is connectable with a selected one of a plurality of insulation clamping blades having arcuate clamping surfaces graduated to grip insulation of slightly varying diameters. The blades are connected by mounting means which facilitate changing of the clamping blades, as required.

---

The present invention relates generally to the art of stripping an outer covering material from a filamentary core material, and is more particularly concerned with improvements in the cutting and clamping means such as utilized for the stripping of insulation from an electrical conductor.

In conventional wire stripping apparatus such as heretofore utilized for removing insulation from the ends of a predetermined length of wire, an insulated wire is fed into a cutting and stripping position where cutting blades sever the insulation and wire core and thus form adjacent severed wire ends. The insulation is now removed from each of the severed ends by means of a first instrumentality in the form of cutting means which are adjusted to cut through the insulation adjacent the severed end of the wire. This operation is accurately set so that the cutting means will cut only up to the wire core, but will not cut into or nick the wire core.

A second instrumentality is also provided in the form of associated clamping means arranged to grip the severed end portion of the insulation, and upon effecting a relative movement between the wire core and the clampingly held severed insulation portion, the insulation end portion will be stripped or separated from the inner wire core so as to leave a bare wire core projecting end.

In the past, these first and second instrumentalities have been embodied into a pair of coacting blade members which are operable towards each other into a cutting position, and away from each other to a noncutting position. Each of the blade members comprised an integrally formed arcuate cutting edge having bevelled sides for severing the insulation, and an adjacent arcuate clamping surface operable into gripped engagement with the adjacent outer surface of the insulation surrounding the wire core. These blade members, as thus constructed, had to be essentially custom made for each wire gauge. Such blades were relatively very expensive, and even though the blades were constructed with great care and precision, satisfactory operation of the blades was difficult of attainment for the reason that a conductor of a specific wire gauge did not have a standard insulation thickness which was maintained within the comparable close tolerances of the wire.

It will therefore be appreciated that with blades as described above having a fixed relationship between the cutting edge and the clamping surface, variations in insulation could very well produce unsatisfactory results. For example, if the cutting edges are set so as to cut through the insulation, but not into the surface of the wire core, a thicker insulation than that for which the blade clamping surface is designed would cause mashing and bulging deformations of the insulation. On the other hand, if the insulation thickness is less than the blade is designed for, setting of the blade so as to properly clamp the insulation would result in the cutting edge nicking the outer surface of the wire core and permit the final stripped end to be more easily broken. Also, under the latter condition, if an attempt is made to utilize the cutting edge as a die during the stripping operation, the wire core will be scratched. These difficulties, in the integrally formed blades could only be corrected by having a series of blades in which the cutting edge is in each case designed for a specific wire gauge, and in which as between successive blades the clamping surfaces are varied slightly so as to adapt the blades for selective use with different thicknesses of insulation. Such procedure with the custom typed blade becomes a very expensive corrective undertaking.

In order to overcome the disadvantages and problems attending the manufacture and use of the conventional blade structures as described above, it is proposed to provide according to the present invention a composite blade structure which is made in two parts and arranged to be cooperatively supported on a common operating head structure for unitary movements. One of the blade parts is fabricated to provide the first instrumentality with a cutting edge within tolerances comparable with the close tolerance of the wire core. The other blade part instead of being integrally formed is now formed as a separate part which permits of simplified machining operations that enable the clamping surfaces to be fabricated in accordance with the more lenient tolerances compatible with those of the insulation covering. It is therefore a simple matter to economically construct the second parts so that as between a plurality of such parts the clamping surfaces may be arranged in stepped graduations, for example $\frac{1}{1000}''$. For a given wire gauge, it is then a simple matter to selectively choose the second part having the proper insulation clamping surface for engaging the insulation of particular thickness as contained on the wire which is to be stripped.

With the foregoing in mind, it is an object of the present invention to provide a composite blade structure for use in apparatus for stripping an insulated wire, such blade structure being composed of a cutting edge part having a close tolerance compatible with that of the wire core, and a separate associated clamping part having a relatively loose or wider tolerance compatible with respect to that of the insulation.

A further object is to provide a composite blade structure for stripping insulation from a wire core, in which one part is provided with an insulation cutting edge having a close tolerance with respect to the wire core, and which may be operatively assembled with one of a plurality of second parts provided with insulation clamping surfaces respectively graduated to grip insulation coverings of slightly different thicknesses.

Still another object is to provide a composite insulation cutting and clamping blade for wire stripping apparatus, which is selectively variable to compensate for variations in the thickness of an insulation covering applied to a wire core of a particular gauge.

Yet another object is to provide a composite insulation cutting and clamping blade structure in which the clamping surface is selectively variable in a direction radially of the wire axis, and wherein the clamping surface acts to center the wire core with respect to the insulation cutting edge so as to permit the cutting edge to function as a stripping die, and prevent scraping and nicking of the wire surface.

Further objects of the invention will be brought out in the following part of the specification, wherein detailed description is for the purpose of fully disclosing the invention without placing limitations thereon.

Referring to the accompanying drawings, which are for illustrative purposes only:

Figure 1:
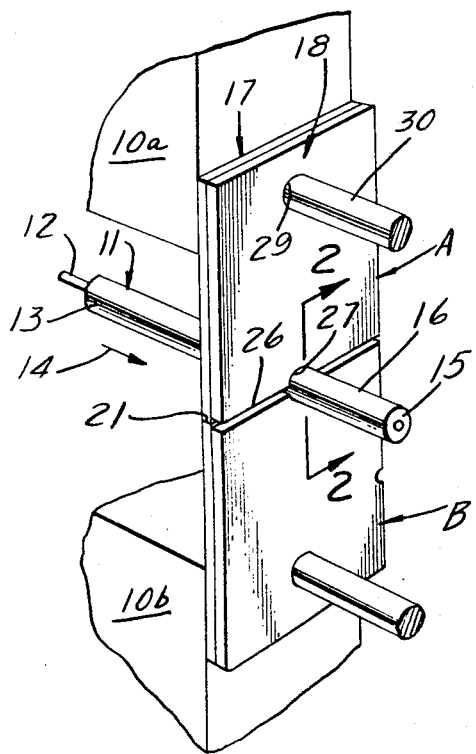
FIG. 1 is a fragmentary perspective view illustrating the insulation cutting and stripping mechanism of wire stripping apparatus embodying composite wire stripping blades constructed according to the present invention.

Referring more specifically to the drawings, for illustrative purposes, there is shown in FIG. 1 a portion of wire stripping apparatus for removing or stripping insulation from the severed ends of an insulated wire conductor. As usually constructed such apparatus has a stripping section which usually embodies spaced head structures 10a and 10b mounted on suitable supports (not shown) for movement towards and away from each other by conventional electric, pneumatic or other suitable power means such as presently well known and used in wire stripping apparatus.

In such conventional apparatus, an elongate filamentary material such as an electrical conductor as generally indicated at 11 and comprised of a central wire core 12 encased in a surrounding insulation covering 13 is arranged to be fed in the direction of the arrow 14 to the stripping position by means of appropriate and well known feed mechanism (not shown).

In the usual stripping apparatus, the conductor is fed to the cutting position while the head structures are in an "open" position. After the desired amount of conductor has been fed to provide the desired cut lengths of conductor, the feeding operation is terminated and the head structures moved towards each other so as to move associated blades into proper position to sever the conductor, for example at a point indicated by the numeral 15 by means of a pair of cutting blades (not shown). At the same time, a pair of cooperable blade structures, as generally indicated at A and B coact to sever the conductor insulation and clamp the severed end of the insulation covering so that upon effecting relative movement between the clamped insulation and the wire core by means well known in stripping apparatus, the end portion as indicated by the numeral 16 will be removed or stripped.

In the conventional arrangement, the blade structures A and B are respectively fabricated as single blade units which embody in each case an arcuate cutting edge with bevelled sides which terminate in cylindrical arcuate clamping surfaces for engaging the adjacent outer surfaces of the insulation during the stripping operation.

The present invention is concerned with an improved construction with respect to the blade structures A and B in order to obtain greater economy of fabrication, increased flexibility which permits blade matching with the particular conductor which is being stripped, and more dependable and reliable stripping without damage to the wire core of the conductor.

More specifically, it will be seen that instead of the blade structures A and B being respectively integrally formed, each of the blade structures, for example, blade structure A comprises a composite structure formed of two associated blade parts, namely, a first part 17 and a second part 18. Since the blade structure A and blade structure B are similar, it is believed that it will only be necessary to describe one of these structures in order to understand the features of the present invention.

Figure 2:
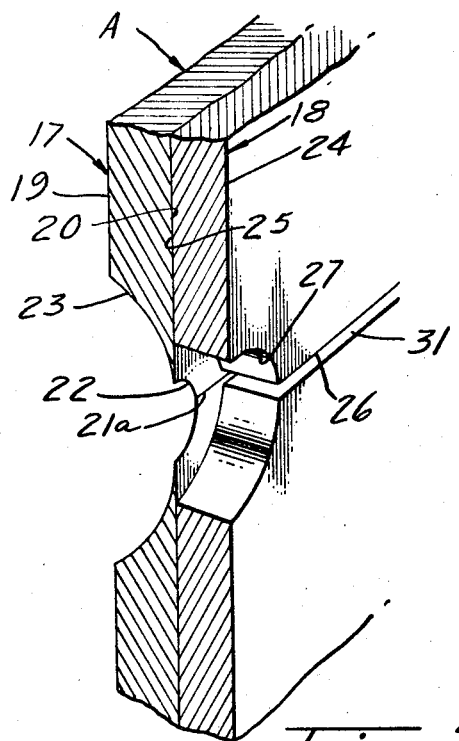
FIG. 2 is an enlarged perspective vertical sectional view through the blade structure, taken substantially on line 2—2 of FIG. 1.
Figure 3:
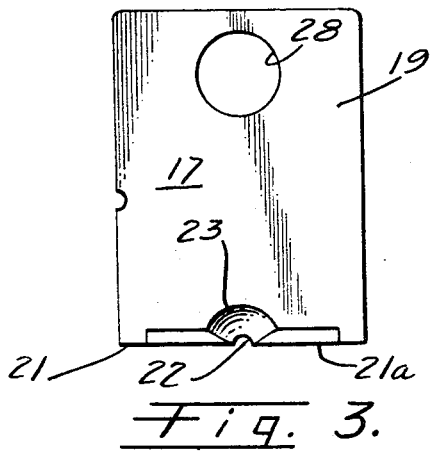
FIG. 3 is a face view of one part of the composite blade.

As best seen in FIGS. 2 and 3, the first part 17 comprises a plate-like member of suitable metallic material having a rectangular configuration. This member is of uniform thickness with an outer planar surface 19 and an inner planar surface 20. At one edge, the bottom edge 21, as viewed in FIG. 3, there is provided a bevelled edge portion which terminates in a transversely extending cutting edge 21a at the surface 20. Centrally of this cutting edge is a semicircular notch providing a cutting edge 22 having concentric relation with respect to a semicircular tapered counterbore 23 which extends inwardly from the surface 19. As thus constructed, the part 17 provides the first instrumentality in the form of the cutting edge 21a and the cutting edge 22, this latter edge having a close tolerance clearance for a particular wire gauge with which it is to be used.

Figure 4:
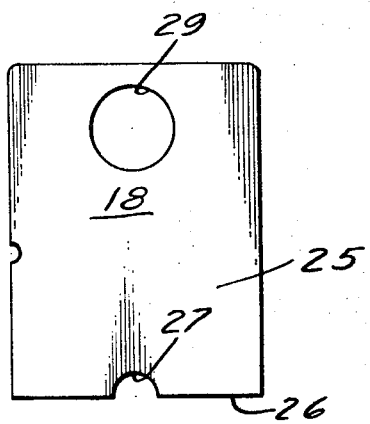
FIG. 4 is a face view of another part of the composite blade.

Referring now to FIGS. 2 and 4, it will be seen that the second part 18 is constructed of a similar plate-like material, and has an outer planar surface 24 and an inner planar surface 25 which bears against the inner surface 20 of part 17. The part 18 has an edge 26 containing an edge notch 27 adapted to be axially aligned with the axis of the cutting edge 22. In this case notch 27 has an arcuate wall surface of uniform radius of curvature, which extends between the planar surfaces 24 and 25 to provide the second instrumentality in the form of clamping means.

The parts 17 and 18 are respectively provided adjacent their edges, which are opposite edge 21 and edge 26, with openings 28 and 29 adapted to receive a supporting pin 30 therethrough, this pin being carried by the adjacent head structure 10a. The parts 17 and 18 are thus held in cooperative relation so as to form a composite two part blade structure. As thus mounted, it will be observed that the edge 21 of part 17 projects slightly beyond the edge 26 of the part 18. This permits the composite blade structures A and B to be adjusted so that the confronting edges 21 thereof may be adjusted for minimum clearance and so as to cut all the way through the insulation, while the adjacent edges 26 of the part 18 will at this time be slightly spaced apart to provide a greater clearance as indicated at 31. This clearance provides a relief for the flow of insulating material to the end that a solid clamping action may be obtained in the edge notch 27.

According to the present invention, it will be appreciated that by utilizing a composite blade structure as just described, the first part 17 may be fabricated to close tolerances with respect to the cutting edge 22, and that a plurality of interchangeable second parts 18 may be provided in which the radius of curvature of the notch 27 may be in graduated steps, for example, of $\frac{1}{1000}$ of an inch. The proper clamping instrumentality of the composite blade can therefore be selected so as to take care of various thicknesses of insulation as required for stripping different runs of wire of the same gauge.

It will further be appreciated that selection of the appropriate second part 18 to give the desired clamping action, will also provide the desirable result of centering the conductor so that the wire core 12 thereof will be centered in the opening formed by the cooperably associated cutting edges 22—22 of the composite blade structures A and B. This will prevent nicking of the wire core and permit the first part 17 to operate as a die blade during the stripping operation.

It is believed that from the foregoing description, it will be clearly evident that the composite blade structure of the present invention will accomplish the designated objects and provide a blade arrangement for the purpose which can be most economically fabricated, and which will provide greater flexibility and more satisfactory results than are presently possible with conventional blades wherein the cutting and clamping portions are integrally constructed.

Various modifications may suggest themselves to those skilled in the art without departing from the spirit of my invention, and, hence, I do not wish to be restricted to the specific forms shown or uses mentioned, except to the extent indicated in the appended claims.

I claim:
1. A composite blade structure for cutting and stripping an insulation covering from a wire, comprising:
   (a) an insulation cutting blade formed by a plate-like substantially rectangular member having parallel side surfaces, one edge of the member having a bevelled portion extending between said surfaces and providing a cutting edge at one of said side surfaces;
   (b) a tapered arcuate notch at said edge having its large end opening in the other of said side surfaces and its small end opening in said one of said side surfaces, said latter opening having a radius of curvature adapted to receive wire of a particular gauge therein;
   (c) a separate adjacent clamping blade having an arcuate insulation clamping surface of uniform predetermined radius of curvature; and
   (d) means for releasably supporting said blades in cooperative relationship for unitary movement, whereby clamping blades having clamping surfaces of different radii of curvature are selectively associable with the cutting blade.

2. A variable cutting and clamping blade structure for stripping insulation from wire cores of predetermined size, wherein the diameter of the insulation may vary slightly for different wire runs, comprising:
   (a) insulation cutter means including a cutting edge with a notch for receiving therein a wire core of predetermined gauge;
   (b) insulation clamping means including elements having clamping surfaces selective to grip insulation coverings of different diameters; and
   (c) means for releasably connecting for coaction as a unit the cutting means and a selected clamping element having the desired clamping surface for the diameter of insulation on the wire being stripped.

3. A variable cutting and clamping blade structure according to claim 2, wherein the elements of the clamping means comprises a plurality of insulation clamping blades, said clamping blades each having a notched edge forming an arcuate clamping surface, the clamping surface of the respective clamping blades being variably graduated as to their radii of curvature to compensate for variations in insulation diameter.

References Cited

UNITED STATES PATENTS 3,125,909 3/1964 Hindenburg _____ 81—9.5
3,226,815 1/1966 Kelly _____ 81—9.5 X MILTON S. MEHR, *Primary Examiner.*